United States Patent [19]

Bradshaw

[11] Patent Number: 4,625,412
[45] Date of Patent: Dec. 2, 1986

[54] APPARATUS AND METHOD FOR MEASURING THE WEAR OF RAILROAD RAIL

[75] Inventor: Bruce W. Bradshaw, Ludington, Mich.

[73] Assignee: Jackson Jordan, Inc., Ludington, Mich.

[21] Appl. No.: 775,587

[22] Filed: Sep. 13, 1985

[51] Int. Cl.⁴ .............................................. G01B 7/28
[52] U.S. Cl. ...................................... 33/1 Q; 33/287; 33/144; 33/547; 33/551
[58] Field of Search ................ 33/1 Q, 287, 338, 144, 33/546, 547, 551, 552, 553, 557

[56] References Cited

U.S. PATENT DOCUMENTS

| | | | |
|---|---|---|---|
| 3,517,307 | 6/1970 | Wallen, Jr. et al. | 33/144 |
| 3,864,039 | 2/1975 | Wilmarth | 33/287 |
| 4,069,590 | 1/1978 | Effinger | 33/1 Q |
| 4,075,888 | 2/1978 | Buhler | 33/144 |
| 4,288,855 | 9/1981 | Panetti | 33/1 Q |
| 4,288,926 | 9/1981 | Long et al. | 33/1 Q |

Primary Examiner—Willis Little
Attorney, Agent, or Firm—Leydig, Voit & Mayer

[57] ABSTRACT

An apparatus and method is provided for measuring the wear in the cross-sectional profile of a railroad rail. A carriage is adapted for travel along the length of the rail and includes means for moving transversely with respect to its direction of travel in response to wear in the railhead of the rail. Distance sensors fixedly mounted to the carriage sense the changes in distances from the carriage to the rail as the carriage moves in a direction transverse to the direction of travel. The sensors relate the changes in these distances to wear in the top and gauge sides of the railhead.

17 Claims, 5 Drawing Figures

APPARATUS AND METHOD FOR MEASURING THE WEAR OF RAILROAD RAIL

The invention generally relates to measuring the wear of railroad rails, and, more particularly, it relates to measuring the wear in the cross-sectional profile of the railhead portion of a railroad rail.

It is well known that rail surfaces experience wear, especially in curves. Uneven wear along the length of the running surface of the rail tends to create undulations and corrugations in the surface. Such uneven wear is undesirable, and the running surface of a rail plagued with undulations and corrugations is typically planed by a grinding machine carried over the rail to remove the unevenness along the length of the rail. Of course, before a section of rail can be identified as needing grinding, some kind of measurement of undulations and corrugations must be carried out. One approach to measuring undulations and corrugations is disclosed in co-pending U.S. patent application Ser. No. 524,724 to Jaeggi, assigned to the assignee of the present invention and hereby incorporated by reference.

In addition to undulations and corrugations along the length of the rail, wear of a railroad rail is also characterized by reduction in the width and height of the cross-sectional profile of the railhead. To the best of applicant's knowledge, presently the only means for measuring width and height wear is either a manual method using a template or cumbersome automated systems such as the one disclosed in U.S. Pat. No. 4,069,590 to Effinger.

It is an object of the invention to provide an apparatus and method for automatically measuring the change in railhead width and rail height caused by wear without requiring the use of cumbersome electromechanical devices. In this connection, it is a related object of the invention to provide an apparatus and method for continuously and automatically measuring wear as the carriage supporting the apparatus moves along the rail surface.

It is also an object of the invention to reference the apparatus of the invention relative to the rail without necessitating the apparatus contact a non-wear surface.

Other objects and advantages of the invention will be apparent from the following detailed description and the accompanying drawings.

Briefly, an apparatus for measuring the wear in the cross-sectional profile of a railroad rail is provided which includes a carriage adapted for travel along the length of the rail and also adapted for movement in directions transverse to the direction of travel in response to wear in the profile of the rail. Measuring means are fixedly mounted to the carriage for measuring the transverse motion of the carriage relative to the rail and providing an indication of wear in the railhead of the rail as a function of the measured transverse motion. By providing a plurality of distance sensors mounted to the carriage, the transverse motion of the carriage can be divided into its horizontal and vertical components which correspond to wear in the gauge side of the railhead (horizontal component) and wear in the top side of the railhead (vertical component).

While the invention has been shown and will be described in some detail with reference to a specific exemplary embodiment, there is no intention to limit the invention to such detail. To the contrary, it is intended to cover all modifications, alternatives and equivalent arrangements which fall within the spirit and scope of the invention as defined by the appended claims.

Figure 1:
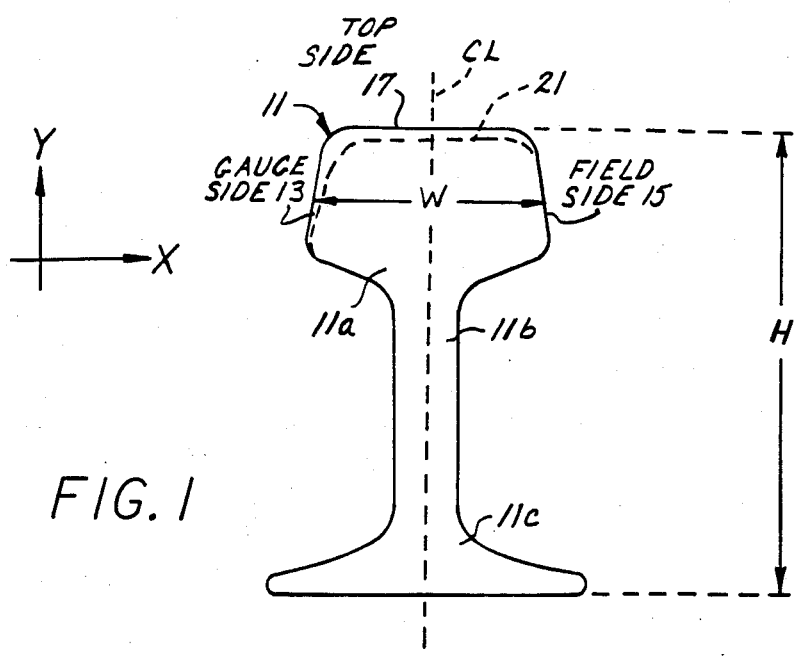
FIG. 1 is a cross-sectional view of a rail illustrating in dashed line the profile of the rail after it has worn.

Turning to the drawings and referring first to FIG. 1, a rail 11 is comprised of a railhead 11a, a web 11b and a base 11c. The railhead 11a itself comprises gauge and field sides 13 and 15, respectively, and a top surface 17. Wheels supporting a chassis for travel along the rail 11 typically bear on the gauge and top side surfaces 13 and 17, respectively, of the railhead 11a as illustrated by the wheels 20 of the carriage 19 in FIG. 2.

Normal use of the rail 11 causes the gauge and top side surfaces 13 and 17 to wear such that the profile of the rail changes as illustrated by the dashed line 21 in FIG. 1. Extended use of the rail 11 eventually wears the rail to a point that its profile is so deformed that it no longer safely and efficiently supports the wheels of a carriage. In order to identify excessively worn rail 11, the invention provides means for measuring the change in the width W of the railhead 11a and the height H of the rail 11.

Figure 2:
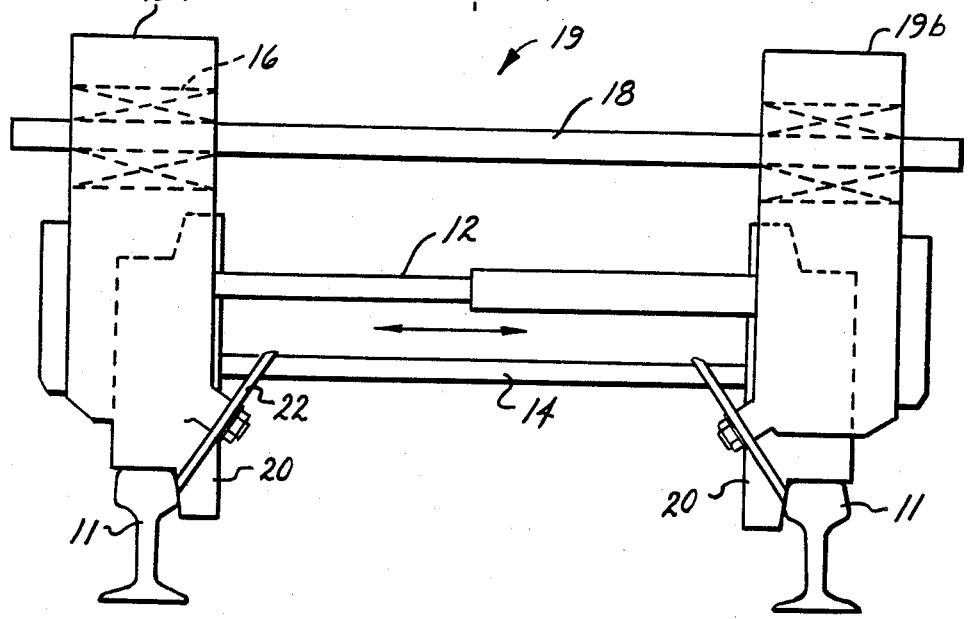
FIG. 2 is a schematic block diagram of a carriage supporting the apparatus of the invention for travel along a railroad rail.

The carriage 19 schematically illustrated in FIG. 2 provides support for the measuring means of the invention. Stabilizing rods 18 connect left and right sections 19a and 19b of the carriage 19 and function to keep the carriage sections and associated measuring means in proper angular relationship with the rail 11. As discussed hereinafter, each of the carriage sections 19a and 19b may move laterally relative to the rail 11 supporting the section. In order to accommodate this lateral movement, the carriage section 19a includes linear bearings 16 for receiving the stabilizing rods 18. Each of the carriage sections 19a and 19b is supported on an associated rail 11 by a plurality of wheels 20 (only one is shown in FIG. 2 for each section 19a and 19b). Of course, opposing wheels 20 are connected for rotation by an axle 14.

The plurality of wheels 20 support the carriage 19 for travel along the length of the rail in a manner set out in the aforementioned copending U.S. patent application Ser. No. 524,724 to Jaeggi. Specifically, the wheels 20 are located along the length of each carriage section 19a and 19b to be in an asymmetrical pattern such that no two pairs of wheels 20 on a carriage section are spaced at the same distance. By providing such an arrangement of the wheels 20, the carriage 19 rides the high points of the corrugations and undulation occurring along the length of the rail. By measuring the wear in the profile of the rail in accordance with the invention, the wear in the high points can be determined. Furthermore, once the wear in the high points is known, the wear between high points can also be accurately determined from the measurements gathered by the apparatus of the Jaeggi application.

In accordance with one important aspect of the invention, each of the carriage sections 19a and 19b includes a guide wheel mounted on the section for biased rotation against the gauge side 13 of the railhead 11a such that the carriage moves transversely in linear proportion to the wear on the gauge side; as the carriage section moves transversely, a first distance sensor mounted to the carriage section senses the changing position of the field side 15 of the railhead relative to the sensor. As measured along a horizontal axis (or the x-axis of the Cartesian coordinate system illustrated in connection with FIGS. 1, 3a and 3b), the displacement of the field side 15 of the railhead 11a is equal to the wear on the gauge side of the railhead where the gauge side contacts the guide wheel 22. Since the change in distance sensed by the first distance sensor is trigonometrically related to the horizontal displacement of the field side 15, the signal from the first distance sensor is indicative of any reduction in the width W of the railhead.

In accordance with another important aspect of the invention, each of the carriage sections 19a and 19b includes second and third distance sensors for measuring the distance to the gauge and field sides of the base 11c of the rail 11. In a manner similar to that which relates the measurements by the first distance sensor to the wear in the width W of the railhead 11a, changes in the distances measured by the second and third distance sensors are trigonometrically related to wear along a vertical axis (Y-axis in FIG. 1), or more specifically, to wear on the top surface 17 of the railhead. In order to compensate for lateral movement of the carriage sections 19a or 19b as the guide wheel follows the wear of the gauge side 13 of the railhead 11a, means are provided for averaging the field and gauge distances to the base 11c as measured by the second and third distance sensors, thereby cancelling the effect of any lateral movement by the carriage section.

In keeping with the invention, each section 19a and 19b of the carriage 19 includes a guide wheel 22 mounted on the section for angled rotation such that the guide wheel engages the gauge side 13 of the associated railhead 11a. In order to keep each of the guide wheels 22 in engagement with the gauge side 13 of the railhead 11a, a hydraulic or pneumatic cylinder 12 provides a biasing force which pushes both carriage sections outwardly as indicated by the arrow in FIG. 2.

Figure 3A:
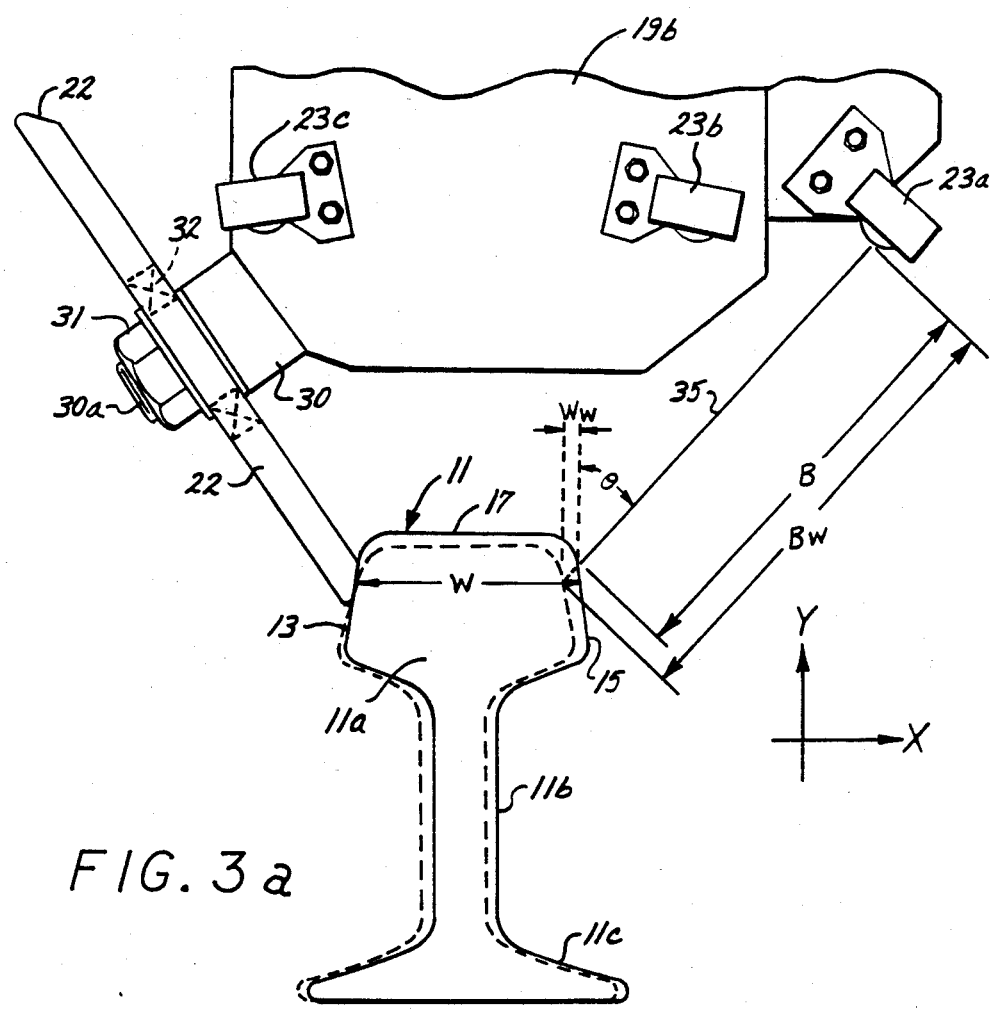
FIG. 3a is a detailed end view of a lowermost portion of one side of the carriage of FIG. 2 showing the measuring apparatus of the invention and detailing that portion of the interaction of the apparatus and the rail which measures the wear in the width of the railhead.
Figure 3B:
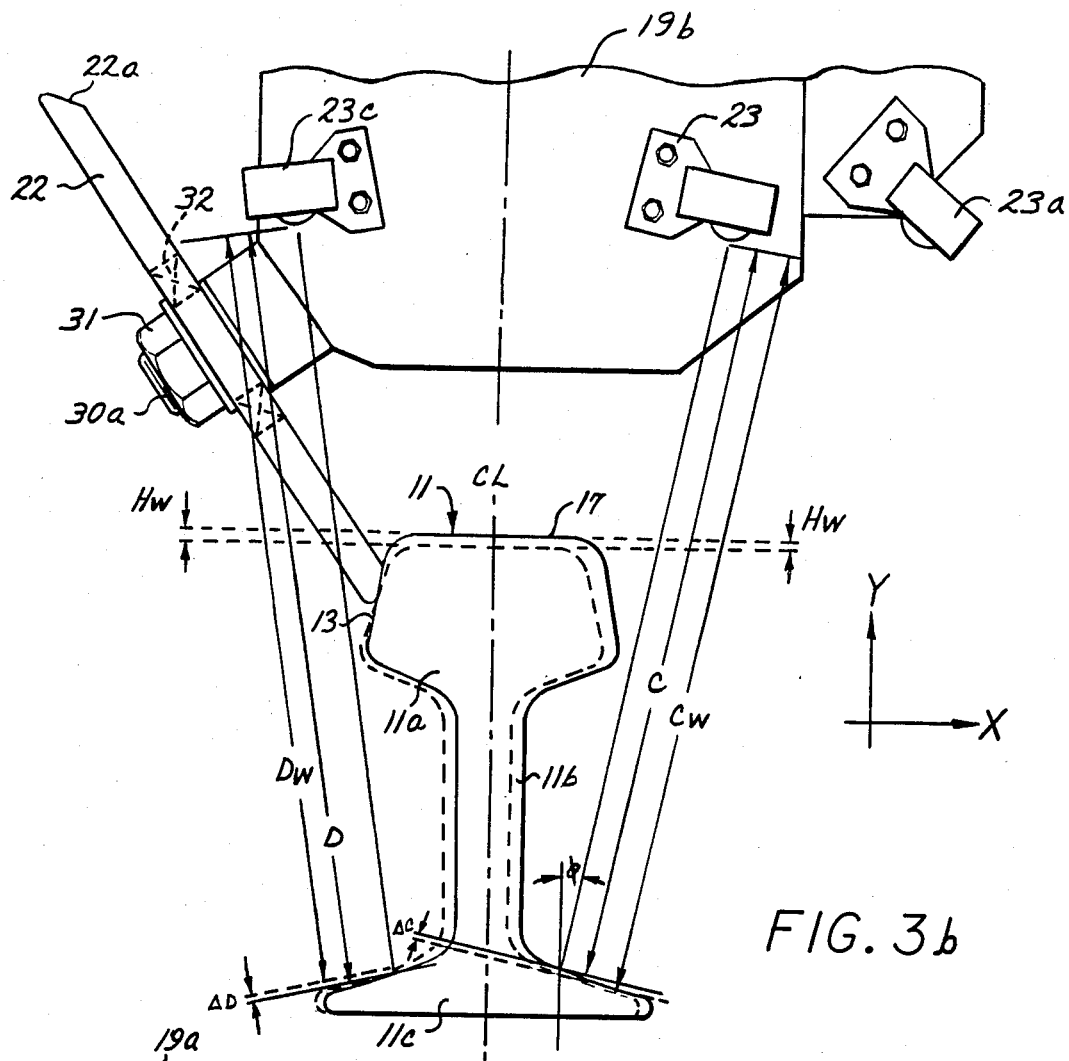
FIG. 3b is the same end view of the lowermost portion of one side of the carriage as shown in FIG. 3a, detailing the portion of the interaction of the measuring apparatus and the rail which measures the wear in the height of the rail.

Referring to FIGS. 3a and 3b, distance sensors 23a, 23b and 23c provide apparatus for measuring wear in the cross-sectional profile of the rail 11 in accordance with the invention. Each of the distance sensors 23a-c includes a source of focused light and a sensor for detected light of the frequency or frequencies emitted by the source. Each distance sensor 23a-c is mounted on the carriage section 19b to have its light incident on distinct areas of the rail 11. Changes in the distant of the light paths between the distance sensors 23a-c and their targets on the rail 11 result in changes in the intensity of the reflected light. By sensing this change in intensity, the distance sensors provide variable output signals which change linearly in response to change in the distances of the light paths.

Although FIGS. 3a and 3b illustrate only the lowermost portion of carriage section 19b, it will be understood that the following discussion equally applies to the distance sensors mounted on carriage section 19a except they are mounted in a mirror-image configuration of that shown in FIGS. 3a and 3b. For ease of understanding, the relative movement between the carriage section 19b and the rail 11 caused by wear in the rail has been illustrated from a reference frame of the carriage section 19b by providing alternative profiles of the rail as indicated in solid and dashed lines. The solid line profile is that of a new, unworn rail. The dashed line profile is that of a used rail which is worn on its gauge and top sides. Since the rail 11 is fixed to a railroad bed surface, obviously the carriage section 19b moves relative to the rail 11 when observed from the reference frame of the ground as indicated earlier in connection with FIG. 2.

An outrigger assembly 30 secured to the body of the carriage section 19b provides rotational support for the guide wheel 22. In order for the guide wheel 22 to present a flat surface to the gauge side 13 of the railhead 11a, the end 22a of the guide wheel is beveled. The shaft 30a of the outrigger assembly 30 receives the guide wheel 22, and the shaft is partially threaded to receive a nut 31 which secures the wheel in place. Bearings 32 are included to aid rotation of the wheel 22 on the shaft 30a.

Referring specifically to FIG. 3a, the distance sensor 23a is mounted to the carriage section 19b and focused to have its light incident on the field side 15 of the railhead 11a. As the guide wheel 22 and cylinder 12 cause the carriage section 19b to move laterally with respect to the rail 11, the distance B from the distance sensor 23a to the field side of the railhead 11a increases in a linear relationship with an increase in the wear on the gauge side 13 of the railhead 11a. An increase in the distance B causes a change in the light intensity reflected back to a photodiode within the distance sensor 23a.

The distance sensors 23a, 23b and 23c are commercially available laser-optic sensors and, preferably, are the Ensco Laser-Optic Sensor manufactured by Encsco Inc. of Springfield, Va. In the Ensco Laser-Optic Sensor the incremental changes in the distance B caused by wear on the gauge side 13 of the railhead 11a cause changes in the output signal from the photodiode which are linearly related to changes in the distance B. But, this linear relationship is over a limited distance, and placement of the distance sensor 23a on the carriage section 19b must be in consideration of the need for a linear relationship for all possible values of the distance B.

Since the distance B is trigonometrically related to the wear on the gauge side 13 as measured along a horizontal X-axis as indicated by the distance $W_w$ in FIGS. 3a, the gain of the signal output from the photodiode of the distance sensor 23a can be adjusted to take account of this relationship. Specifically, the distance B in FIG. 3a corresponds to the measured distance for no wear on the gauge side 13 of the railhead 11a. The distance $B_w$ corresponds to the measured distance for an amount of wear $W_w$ on the gauge side of the railhead as measured along the horizontal X-axis. Letting $\Delta B = B_w - B$, the wear $W_w$ as measured along the X-axis approximately equals $$\Delta B \sin \theta \qquad (1)$$

where the angle $\theta$ is measured between a vertical Y-axis and the beam 35 of light from the distance sensor 23a.

Figure 4:
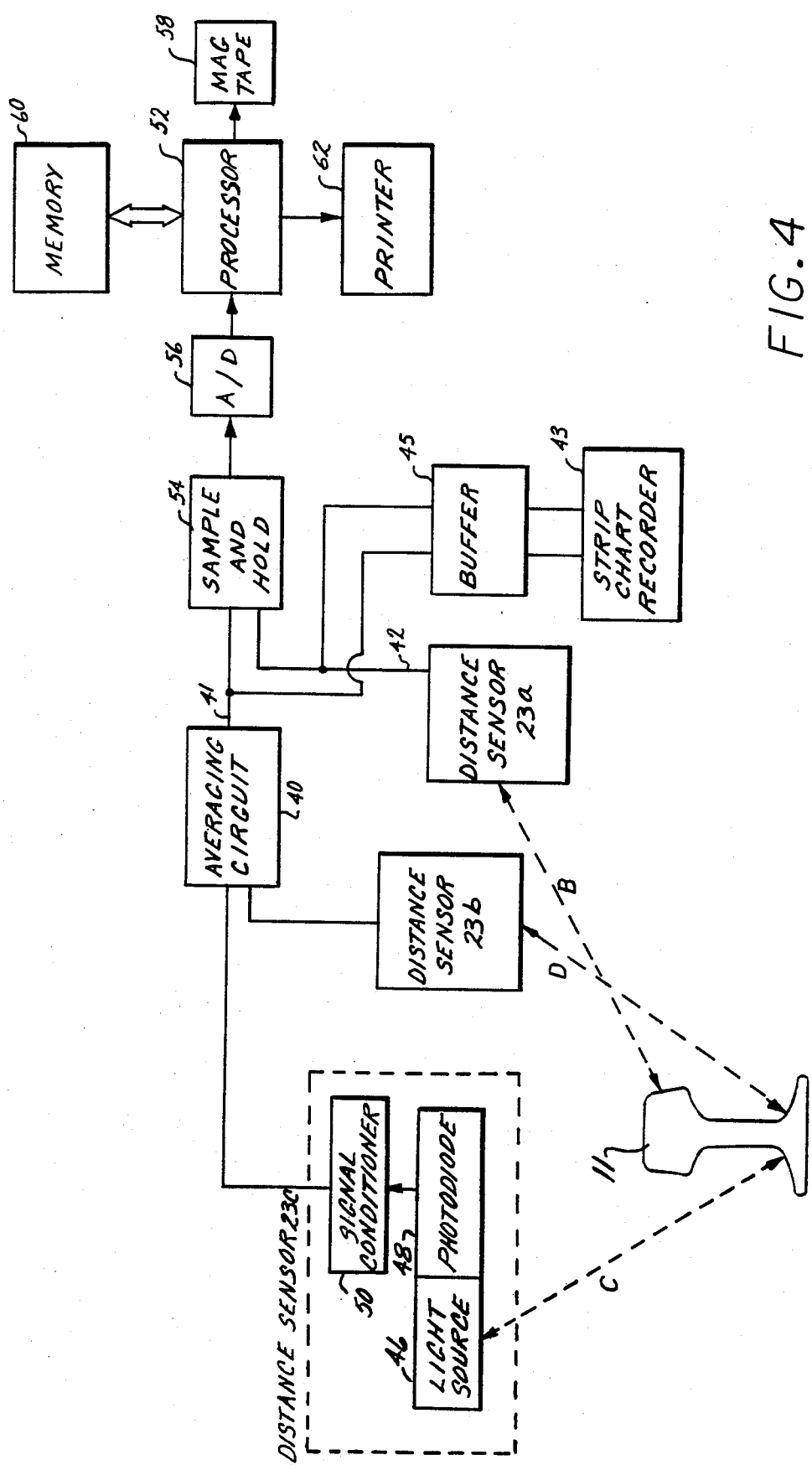
FIG. 4 is a block diagram of a system for processing the raw data provided by the measuring apparatus of FIGS. 3a and 3b.

Since the angle $\theta$ can be determined during the initial set up of the system and since it remains constant during operation of the measuring apparatus, the gain of the distance sensor 23a can be adjusted to provide a voltage signal output directly indicative of the distance $W_w$. For example, the distance sensor 23 may be calibrated to provide a 0 millivolt output voltage for a 0 value for $W_w$, and a 13 millivolt output voltage may correspond to a 13 thousandths of an inch value for $W_w$. By calibrating the distance sensor 23a in such a manner, its output signal can be easily coupled to a meter or strip chart recorder for visualization and quantification of the amount of wear in the width W of the railhead as indicated by FIG. 4.

Although vertical movement of the carriage section 19b in response to wear on the top surface 17 of the railhead 11a may slightly effect the distance B, it has been found that such an effect is insignificant in comparison to the much larger effect on the distance B from lateral movement of the carriage caused by wear in the gauge side 13. Similarly, slight changes in the area of incidents of the light onto the field side 15 of the railhead 11a during lateral movement of the carriage section 19b has been found to have an insignificant effect in measuring the distance B.

Referring to FIG. 3b, the distance sensors 23b and 23c are identical to the distance sensor 23a except that their light beams are aimed to be incident on the base 11c of the rail 11. These distance sensors 23b and 23c and their associated light beams provide signals which, when averaged, are indicative of the wear $H_w$ in the top surface 17 of the rail 11. Although the light beam paths are labeled C and D, the distance sensors 23b and 23c are preferably mounted at the same horizontal level and, therefore, the distances C and D are equal when the sensors are equally spaced about the center line CL of the rail.

Lateral shifting of the carriage section 19b in response to engagement of the guide wheel 22 with a worn gauge side 13 of the railhead 11a causes the light beams from the distance sensors 23b and 23c to change the area of the base 11c on which the beams are incident. To prevent such lateral movement from falsely indicating a change in rail height, the signals from the two distance sensors 23b and 23c are averaged. By averaging the signals, the increase in distance sensed by either distance sensors 23b or 23c caused by lateral movement of the carriage is nullified by an equal decrease in distance sensed by the other sensor.

Wear in the top surface 17 of the railhead 11a causes the distances C and D from the distance sensors 23b and 23c, respectively, to change to distances $C_w$ and $D_w$. The change in the distances, $\Delta C = C - C_w$ and $\Delta D = D - D_w$, are trigonometrically related to change in the height H of the rail 11. Specifically, light paths C, $C_w$, D and $D_w$ are at an approximate angle $\phi$ with respect to a vertical axis or the Y-axis. Therefore, path changes $\Delta C$ and $\Delta D$ have vertical components which equal the wear $H_w$ in the top surface 17 of the rail 11. Because lateral movement of the carriage section 19b introduces error into changes $\Delta C$ or $\Delta D$ taken separately, the value for $H_w$ is calculated as follows:

$$H_w = \frac{\Delta C + \Delta D}{2} \cos\phi \quad (2)$$

where the argument $$\frac{\Delta C + \Delta D}{2}$$

is the average of the changes in the distances C and D. By averaging the changes, the portions of the changes contributed by lateral movement are cancelled. Specifically, lateral movement of the carriage section 19b causes a change $\Delta C$ in the distance C which is equal to the negative of the change $\Delta D$ of the distance D. Expressed in equation form, the relationship is $\psi = -\Delta D$ for changes caused only by lateral movement of the carriage section 19b. From the foregoing, it will be understood that both sensors 23b and 23c are necessary for an accurate measurement of the wear $H_w$ in the height of the rail 11.

Similar to the output of the distance sensor 23a, the output signals of the distance sensors 23b and 23c are preferably calibrated to take account for the angle $\phi$ (the angle $\theta$ for sensor 23a). Specifically, the output signals from the distance sensors 23b and 23c are preferably calibrated to register 0 volts when no wear is present and to register each thousandth of an inch value for $H_w$ as a millivolt of signal output. When mounted to the carriage section 19b so that they operate in their range of linear response, the Ensco Laser-Optic Sensors may easily be adjusted to provide the foregoing calibration.

Because the distance sensors 23b and 23c are approximately symmetrically spaced about the center line CL of an unworn rail, the wear $H_w$ in the top side 17 of the rail 11 is measured from approximately the center of the rail's profile. Through experimentation, it may be shown that the optimum point to measure wear on the top side 17 is at a point other than the center. If the optimum measuring point is off center, the distance sensors 23b and 23c should be relocated to be symmetrically spaced about a vertical axis passing through whatever point in the profile is determined to be the optimum point for measuring wear.

It may occur that the measurements by the distance sensors 23a, 23b and 23c are affected by discontinuities in the rail which are unrelated to wear. For example, stones or pebbles may find their way to the base 11c of the rail 11, or there may be a small imperfection in the field side 15 of the rail 11. Also, rails are sometimes reversed so that their gauge sides become their field sides and vice versa. In order to protect against false readings caused by the foregoing, a second set of distance sensors 23a, 23b and 23c may be mounted to the carriage section 19b to simultaneously measure a different, but adjacent, cross-sectional profile of the rail 11. By comparing the wear of the adjacent profiles, inaccurate readings can be isolated and eliminated.

In order to provide a means for accurately determining the wear in the top surface 17 of the rail 11, the system illustrated in FIG. 4 provides means for averaging the raw data outputs from the distance detectors 23b and 23c. The averaging circuit 40 is comprised of conventional circuitry for adding the two analog signals from distance sensor 23b and 23c and dividing the sum by two. After manipulation by the averaging circuit 40, the signal output represents the wear $H_w$ in the top surface 17 of the rail 11. The wear $W_w$ in the width W of the railhead 11a is accurately represented by the single analog output voltage 42 from the distance sensor 23a. Outputs 41 and 42 are received by a strip recorder 43 by way of a conventional buffer 45 for archiving the width and height wear of the rail.

Each of the distance sensors 23a, 23b and 23c consist of a light source 46, a photodiode 48 and a signal conditioner 50 for controlling the gain of the output signal from the photodiode in order to compensate for the angles $\phi$ or $\theta$. In a conventional manner, the signal conditioner 50 also includes means for preparing the signal for further processing. Such means may include filters for removing noise from the raw output signal of the photodiode.

As either an alternative or supplement to the analog archiving of the collected data, a processor 52 receives the data collected by the distance sensors 23a, 23b and 23c after it has been converted to a digital format by sample and hold circuit 54 and analog-to-digital (A/D) converter 56. The digitized data may be directly recorded onto magnetic tape memory 58 or may first be correlated with other data by the processor 52. For example, memory unit 60 may include maximum wear values for the width wear $W_w$ and the height wear $H_w$. These maximum values are compared in the processor 52 with the actual wear as determined by the measuring apparatus, and the width and/or height wear identified as exceeding the maximum value can be specially processes. For example, values and location of wear exceeding the maximum value may be recorded by the magnetic tape 58 or formated to be printed as a hard copy by a printer 62.

It will be appreciated that well-known devices (such as tachometers) for tracking the present location of the carriage 19 on the length of the rail may be used to identify the location of the excessive wear. It will also be appreciated that the same identification of excessive wear as provided digitally by the processor 52 can be accomplished with the analog signals delivered to the strip chart recorder 43. For example, the analog voltages may be input to a level detector or the strip chart recorder 43 may simply be equipped with paper marked with a maximum deflection line. Of course, the paper drive in the stip chart recorder can be controlled by the signal from the tachometer in order to track the position of the wear along the length of the track. As indicated above, the wear $H_w$ may be combined with the measurements of corrugations and undulations as obtained from the apparatus of the Jaeggi application in order to reference the high points of the corrugations and undulations to the height of an unworn rail. Such correlations or referencing may be carried out by the processor 52 in a well-known manner.

From the foregoing, it can be seen that an apparatus and method for measuring the wear in the cross-sectional profile of a rail is implemented by optical sensors mounted to a section of a carriage adapted for movement along a rail. Wear in the profile of the rail causes movement of the carriage, and the optical sensors detect a change in the position of the carriage relative to the rail. By dividing movement of the carriage section into vertical and horizontal movement, the distance sensors provide an accurate and highly useful indication of wear in the profile of the railhead.

I claim:

1. In a system for measuring the wear in the cross-sectional profile of a railhead of a railroad rail, an apparatus for measuring the width and height of said profile comprising:

a carriage for traveling along said railroad rail;

a first guide means for dynamically positioning said carriage transversely on said railroad rail with respect to the direction of travel for the carriage in response to changes in the width of said profile;

a second guide means for dynamically positioning said carriage transversely on said rail with respect to the direction of travel for the carriage in response to changes in the height of said profile; and a plurality of distance sensors fixedly mounted to said carriage for determining wear in said profile by sensing changes in the transverse position of said carriage relative to at least one reference surface of the rail that is not worn during normal use.

2. An apparatus as set forth in claim 1 wherein said first and second guide means are biased against portions of said railhead which experience wear through normal use.

3. An apparatus as set forth in claim 2 wherein said railhead includes gauge and field sides and said first guide means includes a wheel mounted for rotation on said carriage and for engagement with said gauge side of the railhead wherein said wheel is held in such engagement by a biasing means such that said carriage moves in a horizontal transverse direction with respect to said rail when said second guide means encounters wear in said top side.

4. An apparatus as set forth in claim 2 wherein said second guide means includes at least one wheel mounted for rotation on said carriage and for engagement with the top side of the railhead and being held in such engagement by the force of gravity such that said carriage moves in a vertical transverse direction with respect to said rail when said second guide means encounters wear in said top side.

5. An apparatus as set forth in claim 3 wherein a first distance sensor senses the lateral movement of the carriage caused by said first guide means responding to changes in the width of said profile.

6. An apparatus as set forth in claim 1 wherein second and third distance sensors sense both vertical and horizontal lateral movement of said carriage such that each of said second and third distance sensors senses horizontal lateral movement of the carriage as a change in distance of opposite direction from that of the other distance sensor, but of equal magnitude.

7. An apparatus as set forth in claim 6 including:

means for averaging the output signals of said second and third distance sensors so as to cancel the effect of horizontal lateral movement of the carriage and thereby leave only the effect of vertical wear of the rail.

8. A method of measuring the wear in the cross-sectional profile of a railroad rail wherein the profile of said rail includes field, gauge, and top sides of the railhead, said method comprising the steps of:

guiding a carriage along the length of said rail;

moving the carriage transversely with respect to the length of said rail in response to wear in the gauge side of said railhead;

moving the carriage transversely in response to the wear in the top side of said railhead;

measuring the displacement of the field side of the railhead relative to the carriage as the carriage moves transversely in response to wear in the gauge side of the railhead;

measuring the displacement of a surface of said rail not subject to wear relative to the carriage;

determining from the displacement of the field side of the railhead the wear in the width of the cross-sectional profile of the railhead; and determiming the wear in the top side of said railhead from the displacement of said surface of said rail not subject to wear.

9. A method as claimed in claim 8 wherein said step of determining the wear in the top of said railhead includes the step of removing from the measured displacement of said surface of said rail not subject to wear the effect of transverse movement of said carriage so that the remaining effect is only caused by wear in the top surface of said railhead.

10. An apparatus for measuring the wear in the cross-sectional profile of a railroad rail wherein the profile of said rail includes field, gauge and top sides of the railhead, said apparatus comprising:

a carriage adapted for travel along the length of said railroad rail;

first means for moving said carriage in a first direction transverse to the direction of motion of said carriage along the length of said railraod rail in response to wear in said railhead;

measuring means fixedly mounted to said carriage for measuring the transverse movement of said carriage in said first and second directions relative to at least one reference surface of the rail that is not worn during normal use; and means responsive to the measurements from said measuring means for providing an indication of the wear in the top and gauge sides of said railhead.

11. An apparatus as set forth in claim 10 wherein said means for moving said carriage in a first direction is a guide wheel mounted on said carriage for rotation against the gauge side of the railhead, said guide wheel being held in engagement with said gauge side by a biasing means.

12. An apparatus as set forth in claim 10 wherein said means for moving said carriage in a second direction are wheels supporting the carriage on the top side of the railhead.

13. An apparatus as set forth in claim 10 wherein said measuring means includes a plurality of distance sensors for measuring the distance from fixed locations on said carriage to predetermined locations on the surface of said rail.

14. An apparatus as set forth in claim 13 wherein a first distance sensor senses the change in position of the field side of the railhead in response to transverse movement of the carriage in said first direction.

15. An apparatus as set forth in claim 13 wherein second and third distance sensors sense the change in position of a non-wear surface of the rail in response to transverse movement of the carriage in both said first and second directions.

16. An apparatus as set forth in claim 15 including means for averaging the measurements of said second and third distance sensors in order to cancel any portions of the measurements contributed by transverse movement of the carriage in said first directions.

17. An apparatus as set forth in claim 13 wherein the distances sensed by said plurality of distance sensors are trigonometrically related to wear in the gauge and top sides of the railhead as measured along horizontal and vertical reference lines, respectively.

* * * * *